United States Patent [19]
Kamezawa

[11] Patent Number: 5,482,252
[45] Date of Patent: Jan. 9, 1996

[54] SEAT RING AND BUTTERFLY VALVE FITTING THIS SEAT RING THERETO

[75] Inventor: Jiro Kamezawa, Higashi-Osaka, Japan

[73] Assignee: Tomoe Technical Research Company, Osaka, Japan

[21] Appl. No.: 384,534

[22] Filed: Feb. 8, 1995

[30] Foreign Application Priority Data

Oct. 14, 1994 [JP] Japan .................................. 6-249448

[51] Int. Cl.⁶ ........................................................ F16K 1/22
[52] U.S. Cl. .......................... 251/306; 251/305; 251/367
[58] Field of Search ..................................... 251/305, 306, 251/367

[56] References Cited

U.S. PATENT DOCUMENTS

| | | | |
|---|---|---|---|
| 5,018,704 | 5/1991 | McLennan | 251/367 X |
| 5,236,003 | 8/1993 | Habicht | 251/367 X |
| 5,360,030 | 11/1994 | Sish | 251/306 X |

FOREIGN PATENT DOCUMENTS

| | | |
|---|---|---|
| 3-32847 | 7/1991 | Japan . |
| 3-43522 | 7/1991 | Japan . |
| 3-34523 | 7/1991 | Japan . |

*Primary Examiner*—John C. Fox
*Attorney, Agent, or Firm*—Nixon & Vanderhye

[57] ABSTRACT

A seat ring is resiliently fitted into upper and lower main bodies of a butterfly valve divided in a horizontal direction of piping so as to prevent a fluid from being leaked from the butterfly valve. The seat ring has a cylindrical portion for storing a valve body of the butterfly valve and constructed such that both end faces of the cylindrical portion respectively come in contact with two flanged annular adapters of the butterfly valve; two valve rod holes opposed to each other and formed in the cylindrical portion such that a valve rod for pivotally supporting the valve body extends through the valve rod holes: two first projecting portions having an annular shape and a rectangular shape in cross section and respectively projecting from an outer circumferential face of the cylindrical portion onto an outer side in a diametrical direction at both end edges of the cylindrical portion: a first chamfer formed in the range of a first angle around each of the valve rod holes: and a second chamfer formed in the range of an angle except for the first angle. A third chamfer is gradually connected between the first and second chamfers.

11 Claims, 9 Drawing Sheets

SEAT RING AND BUTTERFLY VALVE FITTING THIS SEAT RING THERETO

BACKGROUND OF THE INVENTION

1. Field of the Invention

The present invention relates to a seat ring and a butterfly valve fitting this seat ring thereto. More particularly, the present invention relates to a seat ring fitted to a butterfly valve in which a valve main body is divided into two sections composed of upper and lower sections in a horizontal direction of piping. The present invention also relates to the butterfly valve fitting this seat ring thereto.

2. Description of the Related Art

In general, piping of a butterfly valve is mainly of a so-called wafer type in which a pipe is supported by pipe flanges therebetween. There are also a screwing type, a clamping system, a housing type joint system, etc. in addition to the wafer type. The number of kinds of piping systems is gradually increasing.

Each of Japanese Utility Model Publication (KOKOKU) Nos. 3-32847, 3-54522 and 3-54523 shows a well-known butterfly valve constructed by a valve main body, a resilient seat ring, a valve body and an annular adapter. The valve main body is divided into two main bodies composed of upper and lower main bodies in a horizontal direction of piping. The resilient seat ring is fitted to this valve main body. The valve body is rotatably arranged within the seat ring and is pivotally supported and mounted to a valve rod extending through each of valve rod holes of the upper and lower main bodies and a valve rod hole of the seat ring. The annular adapter comes in contact with the seat ring.

In the above butterfly valve of the upper and lower dividing system, when the upper and lower main bodies each having a semicircular shape approach each other with the valve rod as a guide at an assembling time, an outer edge portion of the seat ring, a flange portion of the annular adapter and the upper and lower main bodies begin to firstly come in contact with each other in the vicinity of an X-axis of the upper and lower main bodies as a central line of a divisional circle. The outer edge portion of the seat ring is gradually compressed from a portion near the X-axis toward a direction of a Y-axis as a central line of the valve rod holes.

For example, synthetic rubber having an elastic property is used for the resilient seat ring. When one portion of this synthetic rubber is compressed, the shape of an incompressible portion is changed to relax stress caused by this compression.

When the upper and lower main bodies are in close proximity to each other in the butterfly valve of the upper and lower dividing system, the outer edge portion of the seat ring is not compressed at one time, but is gradually compressed. Therefore, the shape of an uncompressed portion is slightly changed to escape and direct compressing stress of a compressed portion to a region of the uncompressed portion. A deforming amount of this uncompressed portion is changed in accordance with frictional and slipping relations between inside faces of the upper and lower main bodies and an inside face of the outer edge portion of the seat ring.

Frictional force caused between the inside face of the outer edge portion of the seat ring and each of the inside faces of the upper and lower main bodies is applied to the butterfly valve in the horizontal direction at an angle approximately ranging from the Y-axis to 30 degrees in the upper and lower main bodies. This frictional force is applied to the butterfly valve in a more perpendicular direction at an angle approximately ranging from 60 degrees to the X-axis.

Namely, when the upper and lower main bodies are in close proximity to each other, an outside face of the outer edge portion of the seat ring entirely comes in contact with a groove portion of the flanged annular adapter in an angular portion equal to or smaller than an angle approximately ranging from the Y-axis to 30 degrees at which the seat ring and the upper and lower main bodies finally come in contact with each other. Therefore, a degree of freedom of deformation is limited in this angular portion so that no seat ring can be moved. Accordingly, the outer edge portion of the seat ring has no place to be escaped. Thus, this outer edge portion is wound inward by the frictional force caused in the horizontal direction between the inside face of the outer edge portion and each of the inside faces of the upper and lower main bodies.

The outer edge portion of the seat ring having a rectangular shape in cross section is compressed by the inside faces of the valve main body and an annular groove into which a side end portion of the seat ring arranged in the annular adapter is fitted. Accordingly, this outer edge portion has effects for preventing a fluid from being leaked from the butterfly valve.

However, to obtain these effects, a slight tapered portion must be formed on the outside face of a flange portion of the annular adapter and must be also formed in each of groove portions of the upper and lower main bodies surrounding this outside face. The annular adapter must be also moved in a Z-axis direction equal to a piping direction while the upper and lower main bodies approach each other in an axial direction of the valve rod. Further, when the upper and lower main bodies are completely coupled to each other, the entire outer edge portion of the seat ring must be compressed in a face-to-face direction equal to the Z-axis direction while a desirable compressing amount of the outer edge portion of the seat ring is secured. Accordingly, when the butterfly valve is assembled, pressing force for coupling the upper and lower main bodies to each other in a vertical direction must be increased to secure compressing force in this outer edge portion of the seat ring.

Further, it is necessary to increase a thickness of the outer edge portion of the seat ring by the compressing amount from a clearance definitely determined by a groove portion of the annular adapter and each of the inside faces of the upper and lower main bodies. Therefore, an outside diameter angular portion of the seat ring outer edge portion on its inner face side tends to be easily wound in by each of the inside faces of the upper and lower main bodies. Accordingly, there are many cases in which an assembly defect is caused and no desirable valve function can be obtained. In particular, in the case of a user requiring periodic cleaning of piping in food industries, etc., a plant or a dedicated jig or tool for disassembling and assembling the butterfly valve is insufficient. Therefore, winding-in of the seat ring is a factor of troubles when the butterfly valve is disassembled and reassembled.

One feature of the butterfly valve of the upper and lower dividing system is characterized in that the butterfly valve can be detached from piping by only disassembling the upper and lower main bodies of this butterfly valve without disassembling the piping itself. However, the outer edge portion of the seat ring is assembled with the compressing amount as mentioned above so that the upper and lower main bodies cannot be separated from each other by only detaching a bolt for fixing the upper and lower main bodies to each other. In this case, the upper and lower main bodies must be separated from each other by hammering an upper flange of the upper main body (as a flange for attaching a driving portion) with a hammer, etc. Otherwise, the upper and lower main bodies must be separated from each other by inserting a screw driver, etc. into a clearance between the annular adapter and one of the upper and lower main bodies and forcibly opening the butterfly valve. Accordingly, there is a fear of damaging the upper and lower main bodies and the annular adapter.

The flanged annular adapter and the upper and lower main bodies are not fixed to each other in a circumferential direction. Accordingly, when the driving portion heavy and voluminous in comparison with the butterfly valve is attached to the upper main body of the butterfly valve, there are often troubles that this driving portion is rotated together with the upper main body by vibrations of piping, etc. and is thereby inverted.

A valve seat formed in the seat ring is constructed by a spherical valve seat having the same diameter as an inside diameter of the seat ring. This valve seat is generally formed in a conical shape with respect to a piping direction. In a system using this seat ring, a pressure fluid is sealed by compressing the seat ring by means of the valve body and the upper and lower main bodies. Therefore, an escaping amount of the valve seat having the conical shape in the piping direction is large in comparison with the circumferential direction. Accordingly, measures for compensating an additional escaping amount of the valve seat must be taken with respect to a portion of this conical shape of the valve seat.

SUMMARY OF THE INVENTION

It is therefore a first object of the present invention to provide a seat ring in which the seat ring is used in a butterfly valve of an upper and lower dividing system and is easily disassembled and reassembled without causing winding-in of the seat ring, and working efficiencies of operations such as maintenance, inspection, cleaning, etc. are greatly improved so that a desirable valve function can be maintained for a long period.

A second object of the present invention is to provide a butterfly valve in which a user can easily disassemble and reassemble the butterfly valve without causing winding-in of the seat ring, and working efficiencies of operations such as maintenance, inspection, cleaning, etc. are greatly improved so that a desirable valve function can be maintained for a long period.

The above first object of the present invention can be achieved by a seat ring resiliently fitted into upper and lower main bodies of a butterfly valve provided by dividing the butterfly valve into two sections in a horizontal direction of piping so as to prevent a fluid from being leaked from the butterfly valve;

the seat ring comprising:

a cylindrical portion for storing a valve body of the butterfly valve and constructed such that both end faces of the cylindrical portion respectively come in contact with two flanged annular adapters of the butterfly valve;

two valve rod holes opposed to each other and formed in the cylindrical portion such that a valve rod for pivotally supporting the valve body extends through the valve rod holes;

two first projecting portions having an annular shape and a rectangular shape in cross section and respectively projecting from an outer circumferential face of the cylindrical portion onto an outer side in a diametrical direction at both end edges of the cylindrical portion;

a first chamfer formed in the range of a first angle around each of the valve rod holes as a center on each of valve rod hole sides of the first projecting portions coming in contact with inner faces of the main bodies; and a second chamfer formed in the range of an angle except for the first angle on each of the valve rod hole sides of the first projecting portions;

the seat ring being constructed such that a size of the first chamfer is larger than that of the second chamfer and a third chamfer is gradually connected between the first and second chamfers.

The above second object of the present invention can be achieved by a butterfly valve fitting the above seat ring thereto and comprising:

the valve body stored into the seat ring;

the valve rod rotatably supporting the valve body;

the two flanged annular adapters respectively coming in contact with both end faces of the seat ring;

the upper and lower main bodies divided in the horizontal direction of piping and storing the seat ring and the valve body and supporting the valve rod; and two annular grooves formed on inner faces of the main bodies such that one of the first projecting portions in the seat ring and a flange of one of the annular adapters come in close contact with each other and are compressed and stored by each of the two annular grooves.

In the above seat ring of the present invention, the first chamfer is formed in the range of a first angle around each of the valve rod holes as a center on each of valve rod hole sides of the first projecting portions coming in contact with inner faces of the main bodies of the butterfly valve. The second chamfer is formed in the range of an angle except for the first angle on each of the valve rod hole sides of the first projecting portions. A size of the first chamfer is larger than that of the second chamfer and a third chamfer is gradually connected between the first and second chamfers. Accordingly, in the above seat ring of the present invention, a first projecting portion as an outer edge portion of the seat ring is compressed while the upper and lower main bodies approach each other at an assembling time of the butterfly valve. A compressing amount of the first projecting portion can be sequentially increased through the second, third and first chamfers in a process for compressing the first projecting portion. The first projecting portion is not compressed at once by an entire preset compressing amount, but is gradually compressed. Therefore, a horizontal frictional force taking a large winding-in action can be converted to a vertical frictional force taking a small winding-in action. Accordingly, it is possible to prevent an angular portion of the first projecting portion from being wound inside. Further, the three kinds of chamfers are formed on a valve rod hole side of the first projecting portion. The second, third and first chamfers are continuously arranged in a small order of a chamfering size. Therefore, the chamfering size of the first chamfer can be set to a required minimum size. Accordingly, a reducing amount of a compressing area caused by chamfering is minimized so that stability of a seal can be secured. As a result, the seat ring is used for the butterfly valve of an upper and lower dividing system in which the butterfly valve can be detached from piping by only disassembling the upper and lower main bodies. Thus, the butterfly valve can be easily disassembled and reassembled without causing winding-in of the seat ring. Accordingly, working efficiencies of operations such as maintenance, inspection, cleaning, etc. are greatly improved so that a desirable valve function can be maintained for a long period.

In the above seat ring of the present invention, the first chamfer is preferably formed approximately within 30 degrees from the center of each of the valve rod holes on each of both sides of the valve rod holes. The second chamfer is preferably formed approximately in the range of an angle equal to or greater than 45 degrees from the center of each of the valve rod holes on each of both the sides of the valve rod holes. In this construction, the compressing amount of each of the first projecting portions can be suitably increased.

In the above seat ring of the present invention, the size of the first chamfer is preferably set to 1.5 times or more the size of the second chamfer. In this construction, a reduction in compressing area caused by the first chamfer can be minimized so that performance of a seal can be stabilized.

In the above seat ring of the present invention, a second projecting portion is preferably formed on an outside face of each of the first projecting portions such that the second projecting portion projects on an outer side in an axial direction from this outside face. The second projecting portion has an annular shape and an inside diameter equal to or larger than an outside diameter of the cylindrical portion. In this construction, the entire compressing amount of each of the first projecting portions can be reduced by reducing a volume of each of the first projecting portions. A deforming amount of each of the first projecting portions can be reduced at a compressing time thereof while performance of a seal is maintained. The seal performance of the compressed seat ring depends on an accuracy in size of a space definitely determined by inner faces of the upper and lower main bodies and grooves of the flanged annular adapters. For example, when the grooves of the annular adapters are not mechanically processed but are processed by precision casting, surface roughness of each of precisely cast products is normally larger than that of each of mechanically processed products. If a dispersion in face accuracy of each of these precisely cast products is compensated by a compressing amount of each of the second projecting portions without increasing an entire volume of each of the first projecting portions, it is possible to cheaply manufacture the seat ring by only the precision casting in which no expensive mechanical processing is required.

In the above seat ring of the present invention, a valve seat receiving portion is preferably formed around each of the valve rod holes on an inner circumferential face of the seat ring and has a valve seat having a recessed spherical shape and formed in the shape of a concentric circle of each of the valve rod holes. The valve seat receiving portion is preferably formed in a planar shape in which an upper face of the valve seat receiving portion is perpendicular to the valve rod. Each of side faces of the valve seat receiving portion is preferably perpendicular to the upper face and is preferably located in the vicinity of an end face of the cylindrical portion such that the valve seat receiving portion comes in contact with the annular adapters. In this construction, it is possible to prevent the valve seat from being moved by compressing the valve body. Further, repulsive force of the valve seat is increased so that a seal of the valve seat can be formed by a minimum compressing amount of the valve body. Torque generated at a rotating time of the valve body is reduced and wearing of the seat ring is reduced by reducing this compressing amount so that a life of the seat ring can be extended.

The butterfly valve of the present invention has the valve body, the valve rod, the two flanged annular adapters, the upper and lower main bodies divided in the horizontal direction of piping, and the two annular grooves. One of the first projecting portions in the seat ring and a flange of one of the annular adapters come in close contact with each other and are compressed and stored by each of the annular grooves. The above-mentioned seat ring of the present invention is fitted into this butterfly valve. Therefore, the first projecting portion as an outer edge portion of the seat ring is compressed while the upper and lower main bodies approach each other at an assembling time of the butterfly valve. A compressing amount of the first projecting portion can be sequentially increased through the second, third and first chamfers in a process for compressing the first projecting portion. The first projecting portion is not compressed at once by an entire preset compressing amount, but is gradually compressed. Therefore, a horizontal frictional force taking a large winding-in action can be converted to a vertical frictional force taking a small winding-in action. Accordingly, it is possible to prevent an angular portion of the first projecting portion From being wound inside. Further, the three kinds of chamfers are formed on a valve rod hole side of the First projecting portion. The second, third and first chamfers are continuously arranged in a small order of a chamfering size. Therefore, the chamfering size of the first chamfer can be set to a required minimum size. Accordingly, a reducing amount of a compressing area caused by chamfering is minimized so that stability of a seal can be secured. As a result, the butterfly valve can be easily disassembled and reassembled without causing winding-in of the seat ring by a user. Accordingly, working efficiencies of operations such as maintenance, inspection, cleaning, etc. are greatly improved so that a desirable valve function can be maintained for a long period.

In the above butterfly valve of the present invention, the main bodies preferably have a planar portion formed within each of the annular grooves in parallel with a divisional face of the main bodies to prevent a relative movement of the main bodies and the annular adapters in a circumferential direction. The flange of each of the annular adapters preferably has at least one linear notch portion corresponding to the planar portion. In this construction, it is possible to prevent the annular adapters from being rotated within the grooves in the upper and lower main bodies. Therefore, it is possible to prevent a driving portion from being inverted by piping vibrations, etc.

In the above butterfly valve of the present invention, an inside face of each of the grooves formed in the main bodies and coming in contact with each of the first projecting portions of the seat ring is preferably inclined slightly inside the seat ring. In this construction, a compressing amount of each of the first projecting portions can be sequentially increased in accordance with an angle of this inclination in a process for compressing each of the first projecting portions of the seat ring while the upper and lower main bodies approach each other at an assembling time of the butterfly valve.

In the above butterfly valve of the present invention, an angle of the inclination is preferably set to range from 1 degree to 5 degrees.

In the above butterfly valve of the present invention, the divided main bodies preferably have respectively boss portions having the same face as a divisional face to fix the divided main bodies to each other by a bolt. A planar groove is preferably formed in at least one of the boss portions of the divided main bodies to definitely determine a clearance externally opening between the boss portions fixed to each other. In this construction, the upper and lower main bodies can be easily separated from each other when the butterfly valve is detached from piping by using a screw driver, etc. Therefore, when the butterfly valve is disassembled, it is possible to prevent the upper and lower main bodies, etc. from being damaged and improve safety of operations.

In the above butterfly valve of the present invention, the planar groove preferably has 0.5 mm or more in depth and has 2 mm or more in length.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a seat ring and a butterfly valve fitting this seat ring thereto in the present invention will next be described in detail with reference to the accompanying drawings.

Figure 1:
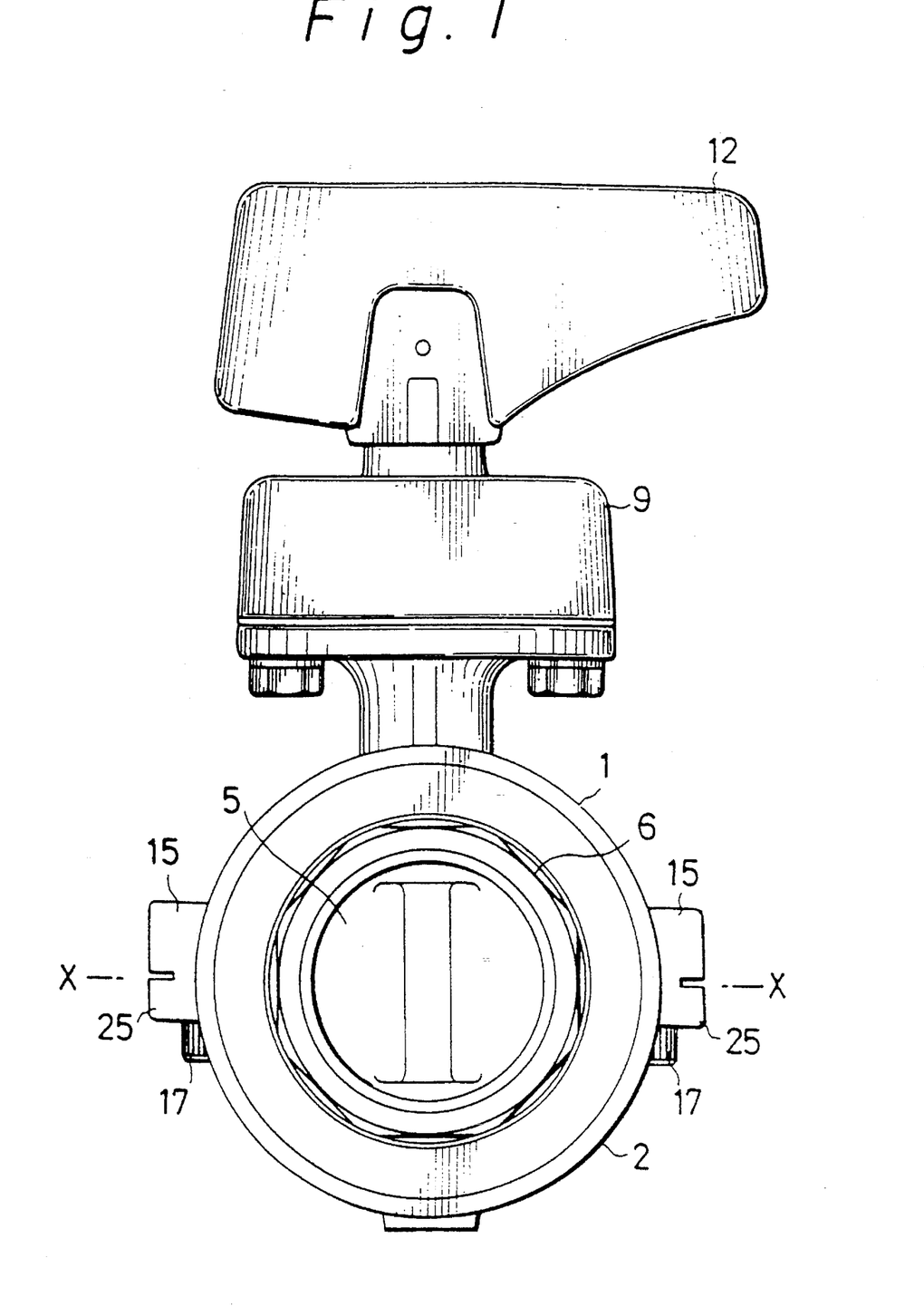
FIG. 1 is a front view of a butterfly valve in accordance with one embodiment of the present invention.
Figure 2:
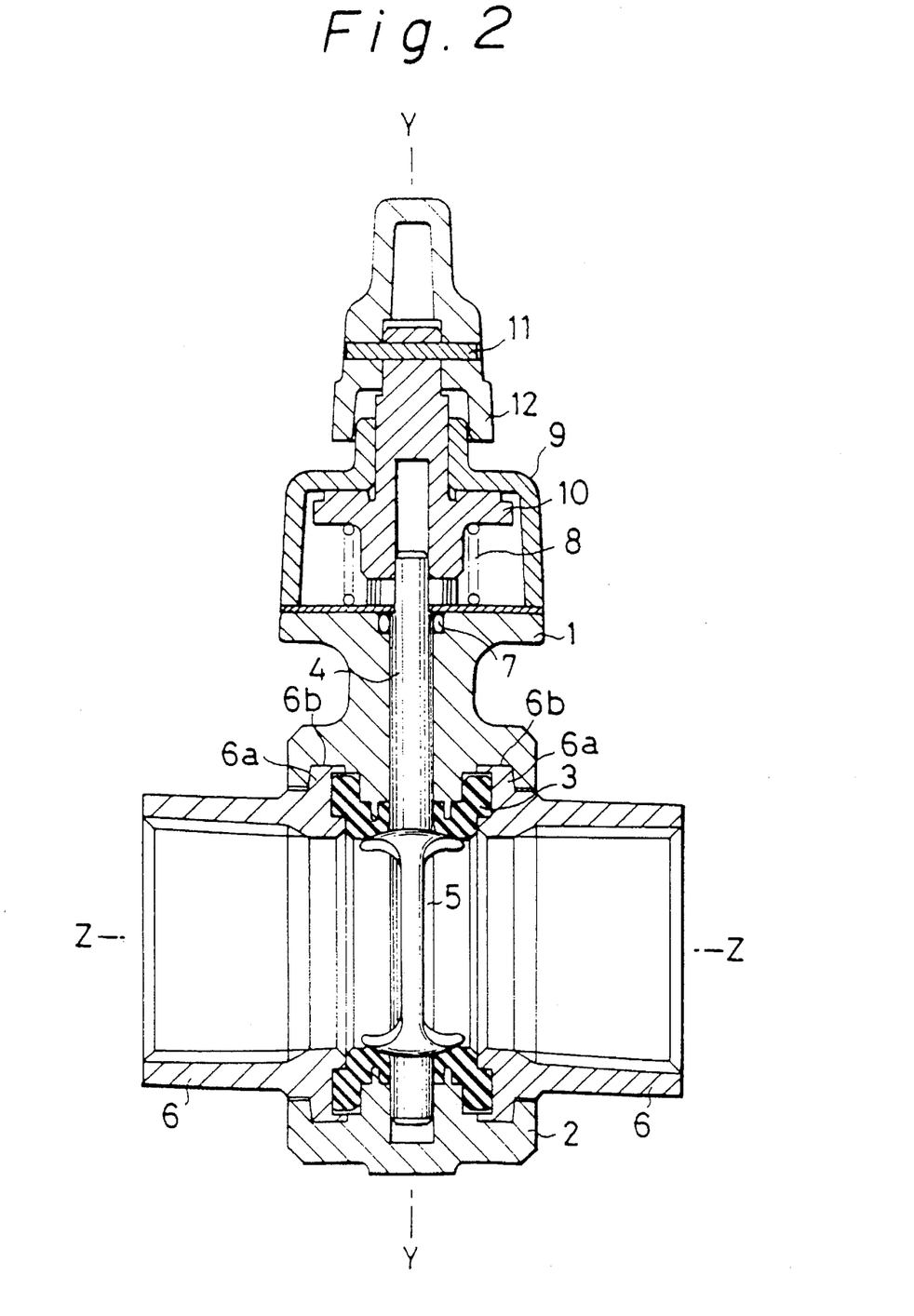
FIG. 2 is a cross-sectional view of the butterfly valve in a piping direction in accordance with one embodiment of the present invention.

FIG. 1 is a front view of a butterfly valve in accordance with one embodiment of the present invention. FIG. 2 is a cross-sectional view showing this butterfly valve in a piping direction.

This butterfly valve is vertically divided into two main bodies composed of an upper main body 1 and a lower main body 2 along an X-axis as a central line of a divisional circle. The butterfly valve further has a resilient seat ring 3, a rotatable valve body 5 and a flanged annular adapter 6. The seat ring 3 is fitted into each of the upper and lower main bodies 1 and 2 and is surrounded by an inner circumferential face and an inside face of each of the upper and lower main bodies 1 and 2. The valve body 5 is pivotally supported by a valve rod 4 and can be rotated within the seat ring 3. The flanged annular adapter 6 comes in contact with both ends of the resilient seat ring 3.

An O-ring 7 for a shaft seal is mounted onto an upper end side of the valve rod 4. Further, a connecting member 10 and a lever 12 are arranged on the upper end side of the valve rod 4. An upper end of the valve rod 4 is fitted into the connecting member 10 with play. The connecting member 10 is biased by a spring 8 and is arranged within a casing 9. The lever 12 is fixed to an upper end of this connecting member 10 by a pin 11.

Figure 3:
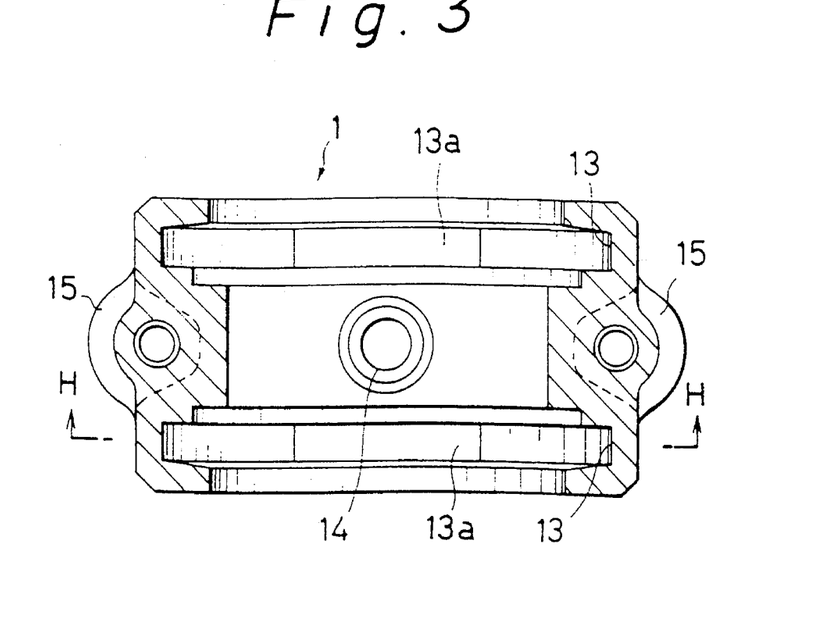
FIG. 3 is a view showing an inner face of an upper main body in the present invention.

FIG. 3 shows an inner face of the upper main body 1. A groove 13 for storing a flange 6aa of the flanged adapter 6 is formed in the upper main body 1. Further, a valve rod hole 14 is formed in the upper main body 1 such that the valve rod 4 extends through the valve rod hole 14. A boss 15 is formed at each of both ends of the upper main body 1. A planar portion 13a is formed in the groove 13 and is parallel to a face of the divisional circle. The planar portion constitutes an antirotation member of the valve main body in cooperation with a straight notch portion 6b parallel to the face of the divisional circle and formed in the flange 6a of the flanged adapter 6.

Figure 4:
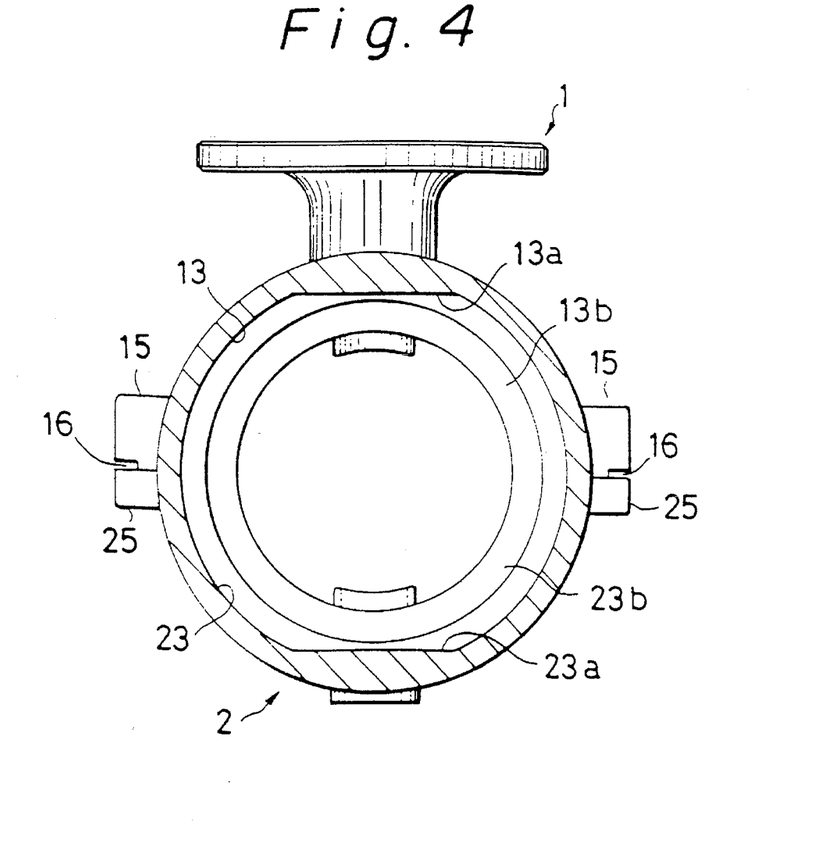
FIG. 4 is a cross-sectional view taken along line H—H in FIG. 3.

FIG. 4 is a cross-sectional view taken along line H—H in FIG. 3 and shows a state in which the upper main body 1 and the lower main body 2 is coupled to each other. The groove 13 for the adapter of the upper main body 1 and a groove 23 for an adapter of the lower main body 2 definitely determine an annular space within the main bodies. Planar portions 13a and 23a parallel to the face of the divisional circle are respectively formed in an upper portion of the groove 13 for the adapter of the upper main body and a lower portion of the groove 23 for the adapter of the lower main body. An inside face 13b of the upper main body 1 and an inside face 23b of the lower main body 2 are respectively formed on inner sides of the planar portions 13a and 23a. Each of the inside Faces 13b and 23b is slightly inclined about an angle ranging from 1 degree to 5 degrees such that the inside faces 13b and 23b open on a side of the valve body 5. The inside faces 13b and 23b definitely determine annular inside faces. Bosses 15 and 25 are respectively formed on outer sides of the upper main body 1 and the lower main body 2 and both sides of a coupling portion of the upper and lower main bodies. A clearance 18 is formed between the bosses 15 and 25 along their outer circumferences. For example, the clearance 18 has 0.5 mm or more in depth and has 2 mm or more in length. A size of this clearance is suitably determined such that a front end of a screw driver, etc. can be inserted into this clearance.

Figure 5:
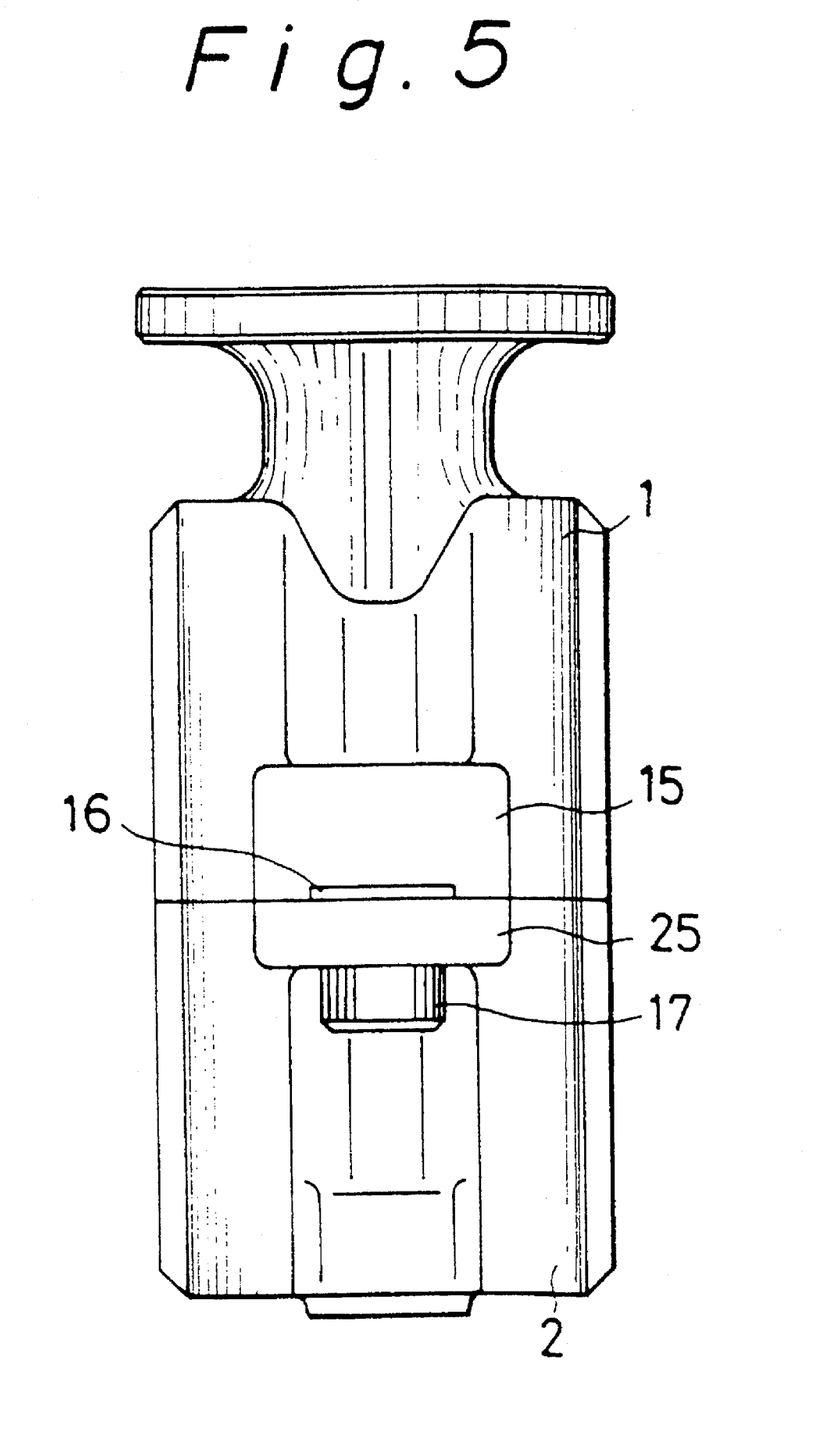
FIG. 5 is a side view of upper and lower main bodies in the present invention.

FIG. 5 is a side view of the upper and lower main bodies 1 and 2. In FIG. 5, the boss 15 of the upper main body 1 and the boss 25 of the lower main body 2 are fixed to each other by a bolt 17 so that the upper and lower main bodies 1 and 2 are coupled to each other. In this coupling state, the clearance 16 is formed between the bosses 15 and 25.

Figure 6:
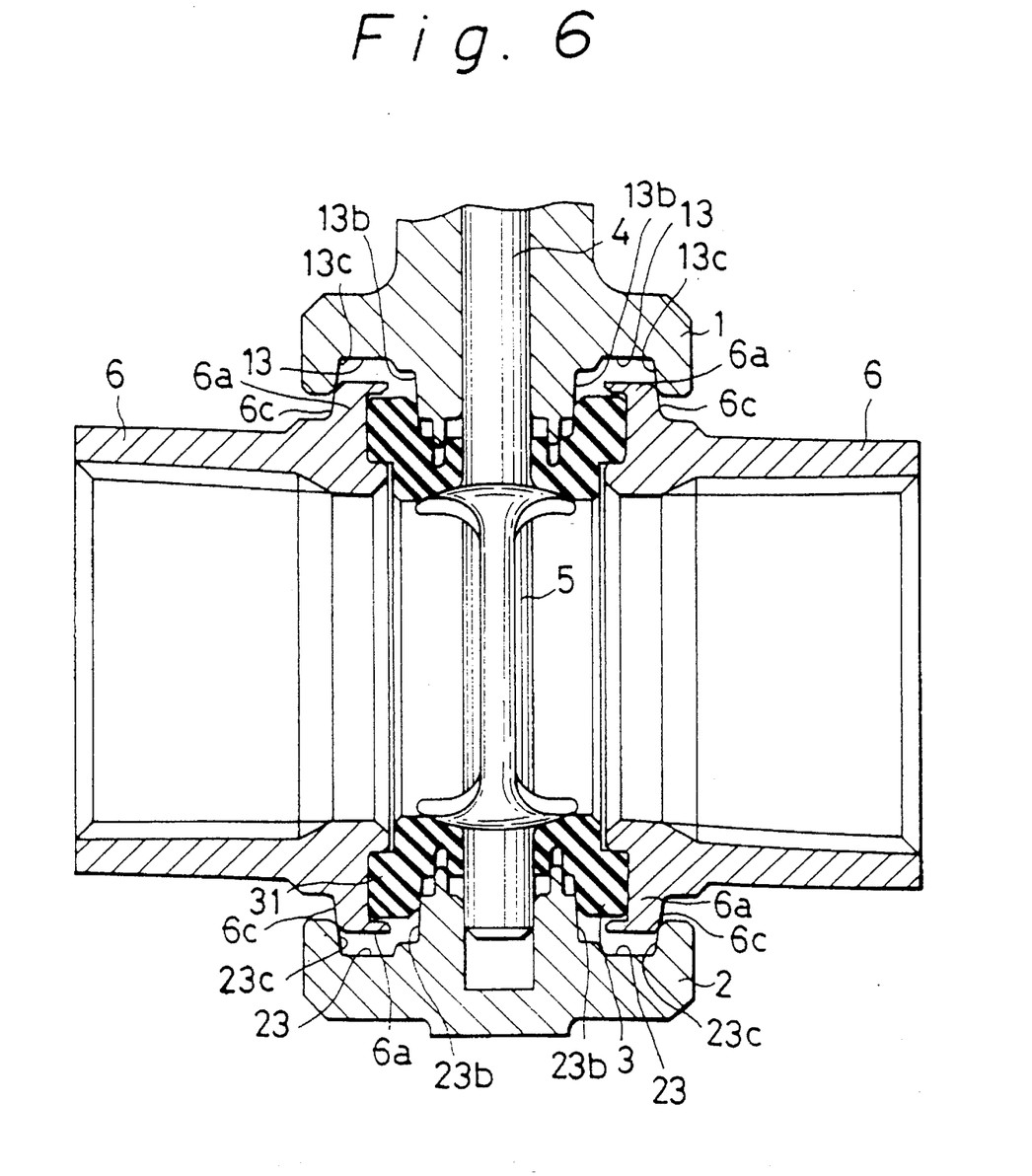
FIG. 6 is a cross-sectional view showing an intermediate coupling state of the upper and lower main bodies in the piping direction.

FIG. 8 shows an intermediate coupling state of the upper and lower main bodies 1 and 2. Slight tapered portions are respectively formed on an outside face 8c of the flange 8a of the flanged adapter 6 and inside faces 13c, 23c of the respective grooves 13, 23 of the upper and lower main bodies 1 and 2 surrounding this outside face 6c. When the upper and lower main bodies 1 and 2 are mutually pressed and approach each other in an axial direction of the valve rod 4, the flanged adapter 6 is moved in a Z-axis direction equal to a piping direction while the flanged adapter 6 presses against the seat ring 3. A desirable compressing amount of an outer edge portion 31 of the seat ring 3 is secured when the upper and lower main bodies 1 and 2 are completely coupled to each other.

Figure 7A:
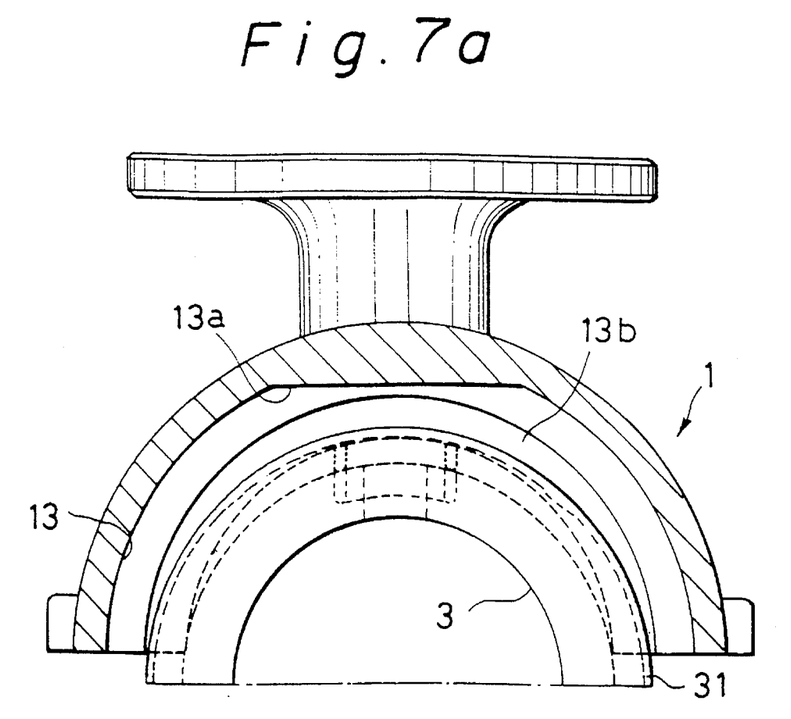
FIG. 7a is a view showing a contact starting stage between the upper and lower main bodies and a flange of a flanged adapter in a process for coupling the upper and lower main bodies to each other.
Figure 7B:
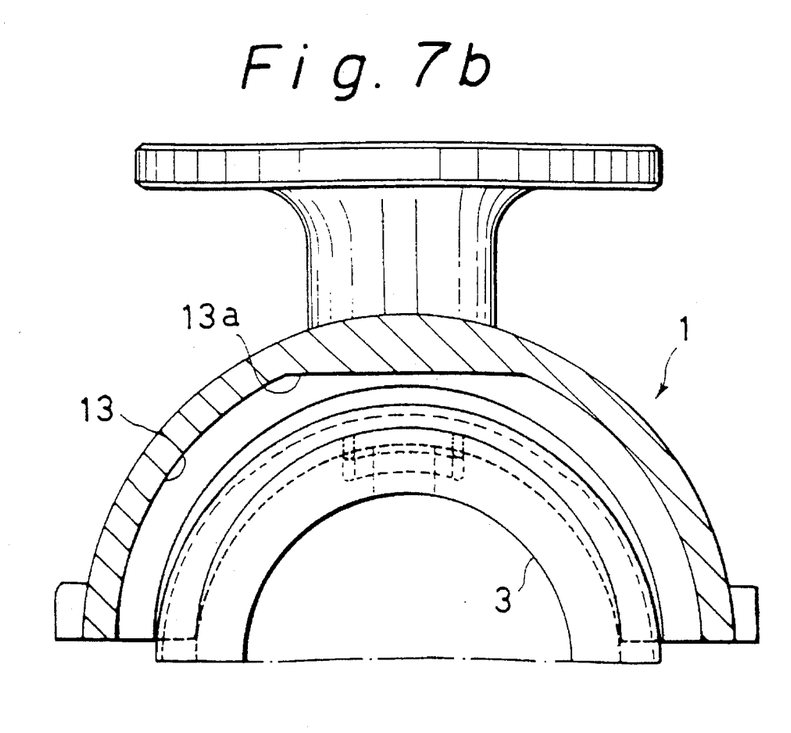
FIG. 7b is a view showing an intermediate coupling stage in the process for coupling the upper and lower main bodies to each other.
Figure 7C:
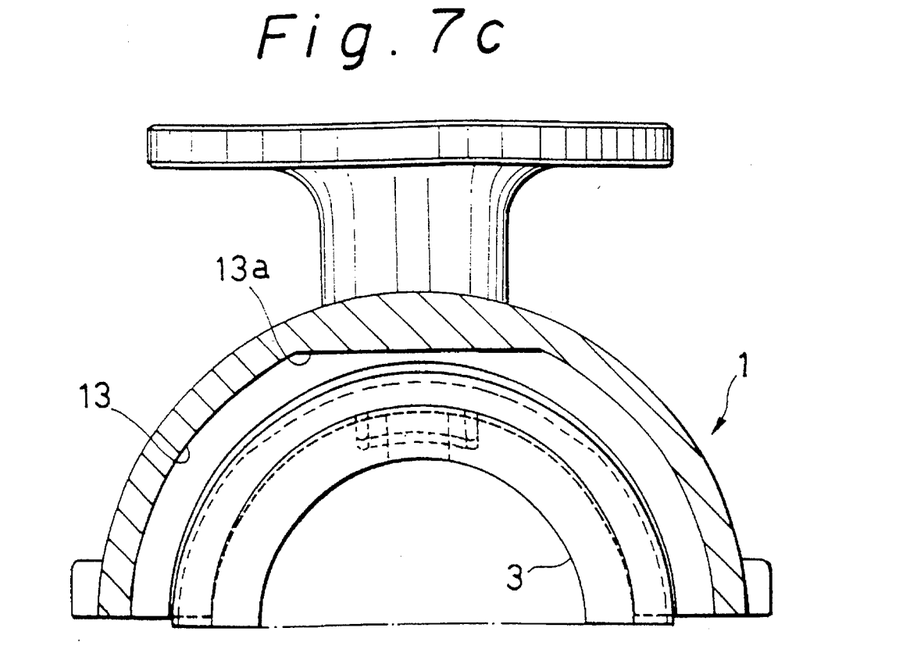
FIG. 7c is a view showing an intermediate coupling stage in the process for coupling the upper and lower main bodies to each other.
Figure 7D:
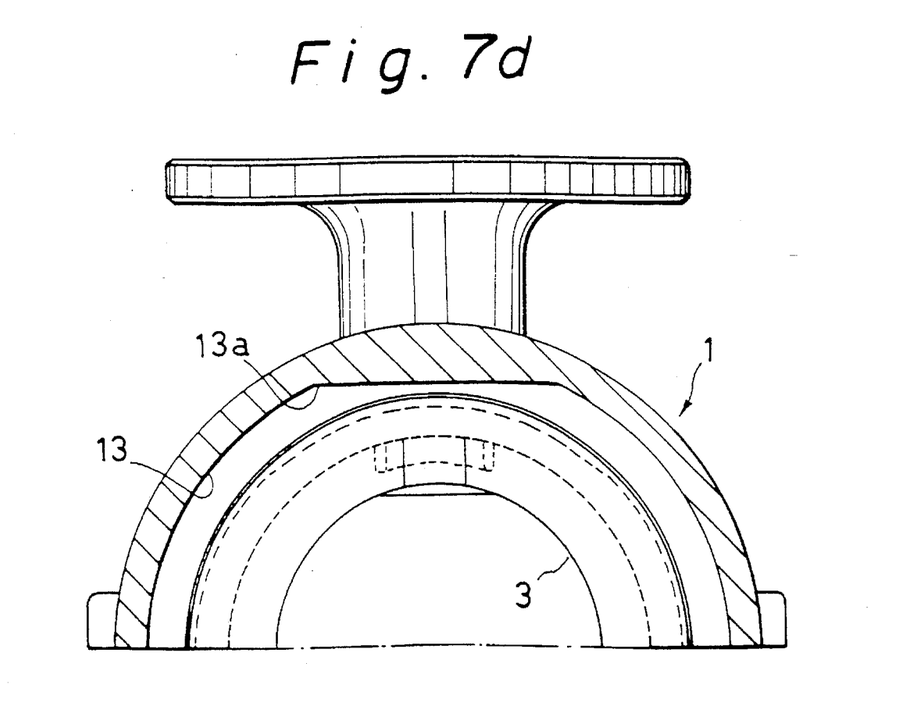
FIG. 7d is a view showing a stage at which the upper and lower main bodies are completely assembled into the butterfly valve.

Each of FIGS. 7a to 7d shows a detailed coupling process of the upper and lower main bodies 1 and 2 shown in FIG. 6 in a state in which the upper main body 1 is seen from a front face of the butterfly valve. FIG. 7a shows a contact starting stage of the upper main body 1 and the flange 6aa of the flanged adapter 6. Each of FIGS. 7b and 7c shows an intermediate coupling stage of the upper main body 1 and the flange 6aa. For example, each of FIGS. 7b and 7c shows a state in which an upper portion of the upper main body 1 on its inside face 13b overlaps an upper portion of the outer edge portion 31 of the seat ring 3 by 1 mm and 2 mm respectively. FIG. 7d shows a stage at which the upper main body 1 and the flange 6aa are completely assembled into the butterfly valve. The above coupling operation is similarly performed with respect to the lower main body 2.

Figure 8:
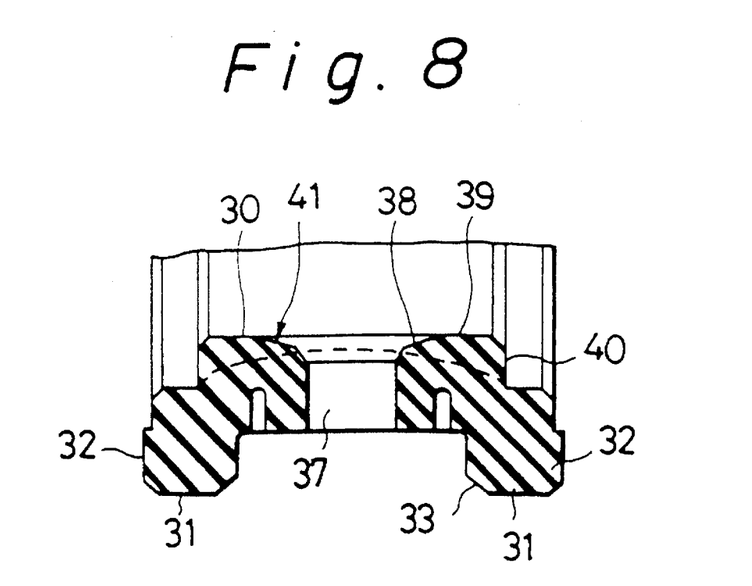
FIG. 8 is a partially longitudinal sectional view of a seat ring in the present invention.
Figure 9:
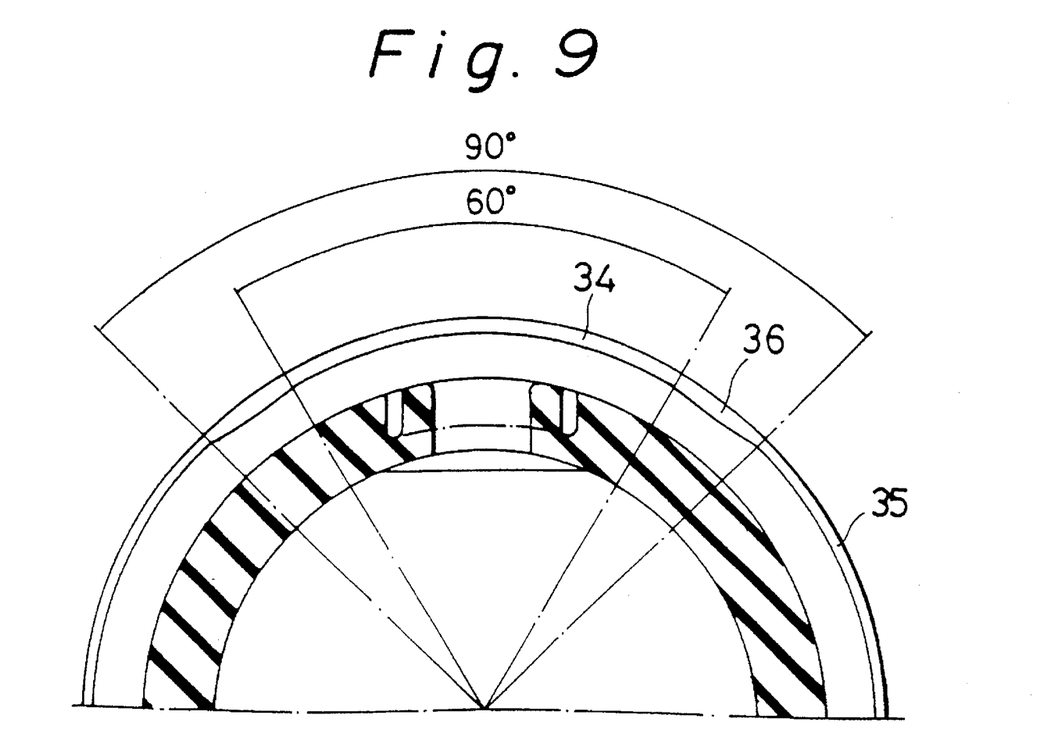
FIG. 9 is a transversal sectional view of an upper half of the seat ring in the present invention.

FIGS. 8 and 9 are respectively a partially longitudinal sectional view of the seat ring 3 and a transversal sectional view of an upper half of the seat ring 3. An outer edge portion 31 as a first projecting portion is formed at each of both end edges of the seat ring 3 such that the outer edge portion 31 projects on an outer side of the seat ring 3 in a diametrical direction. A projecting portion 32 having a band shape is formed as a second projecting portion on an outside face of this outer edge portion 31. This projection portion 32 has an inside diameter equal to or slightly larger than the outside diameter of a cylindrical portion 30 of the seat ring 3. As shown in FIG. 9, each of a large chamfer 34, a small chamfer 35 and a chamfer 38 is formed in a predetermined range in an outside diameter angular portion 33 of the outer edge portion 31 on its inside face. The large chamfer 34 is formed in an angular range of 50 degrees from the center of a valve rod hole. The small chamfer 35 is formed in the range of an angle equal to or larger than 45 degrees from the center of the valve rod hole. The chamfer 58 is formed in the range of an angle ranging from 30 degrees to 45 degrees between the chamfers 34 and 35 such that a chamfering size of the chamfer 38 is gradually changed. A ratio of the chamfer 34 to the chamfer 38 with respect to a chamfering size is preferably set to be 1.5 times or more. The angular range and the chamfering size of each of the chamfers 34, 35 and 38 are suitably determined in accordance with a size, specifications, etc. of the seat ring. A valve seat 38 having a recessed spherical shape is Formed on an inner circumferential face of the seat ring 3 in the shape of a concentric circle of the valve rod hole 37. A valve seat receiving portion 41 is also formed on the inner circumferential face of the seat ring 3. This valve seat receiving portion 41 has a planar face 39 having the same height as a vertex of the valve seat 38 and also has a side face 40 perpendicular to this planar face 39.

Figure 10:
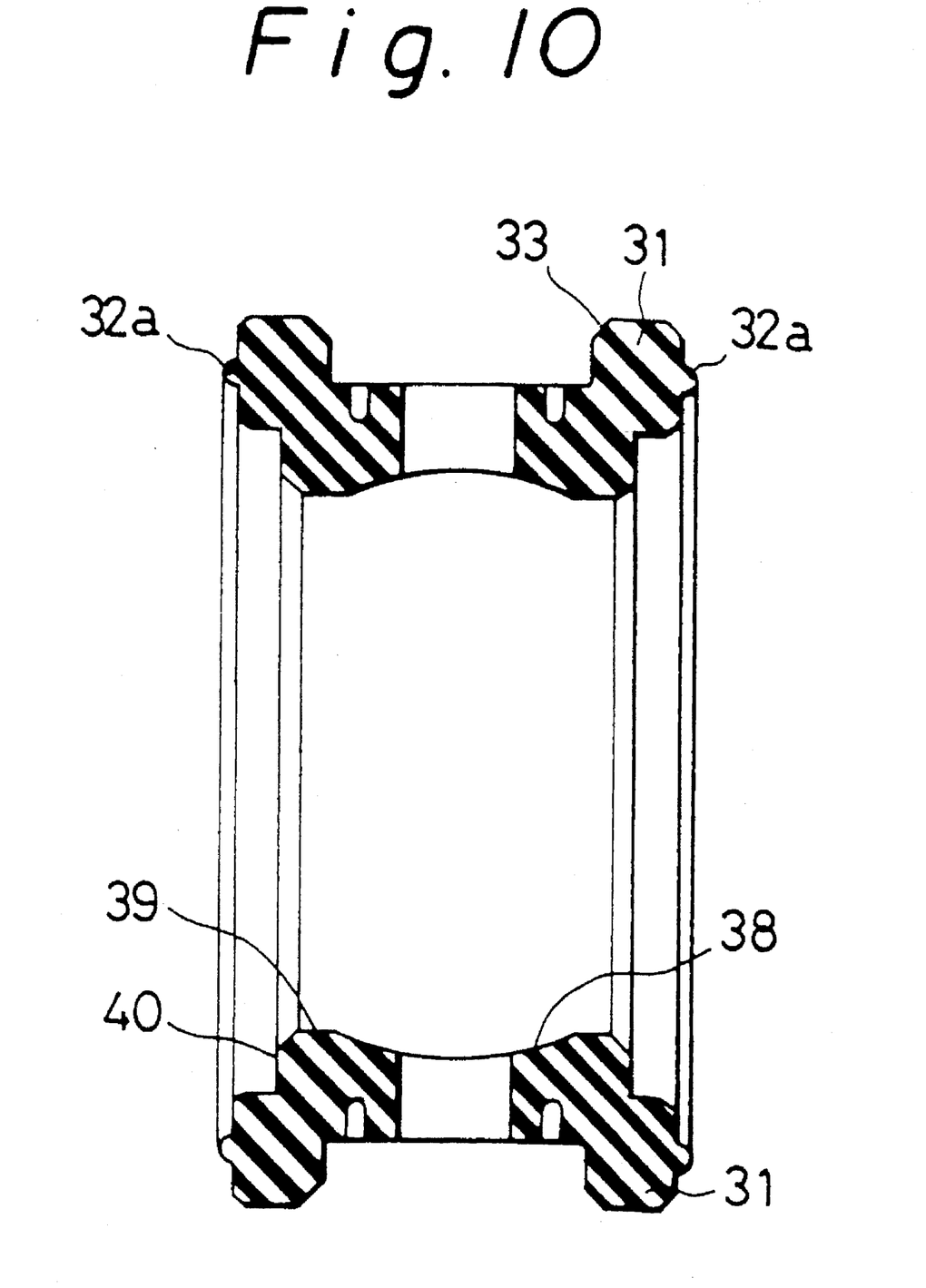
FIG. 10 is a view showing a modified example of the seat ring in the present invention.

FIG. 10 shows a modified example of the projecting portion 32 shown in FIG. 8. In FIG. 10, a projecting portion 32a is formed in a thin annular shape. A plurality of projecting portions 32a each having such a thin annular shape may be formed.

As mentioned above, in accordance with a seat ring of the present invention, a first projecting portion as an outer edge portion of the seat ring is compressed while upper and lower main bodies approach each other at an assembling time of a butterfly valve. A compressing amount of the first projecting portion can be sequentially increased through second, third and first chamfers in a process for compressing the first projecting portion. The first projecting portion is not compressed at once by an entire preset compressing amount, but is gradually compressed. Therefore, a horizontal frictional force taking a large winding-in action can be converted to a vertical frictional force taking a small winding-in action. Accordingly, it is possible to prevent an angular portion of the first projecting portion from being wound inside. Further, the three kinds of chamfers are formed on a valve rod hole side of the first projecting portion. The second, third and first chamfers are continuously arranged in a small order of a chamfering size. Therefore, the chamfering size of the first chamfer can be set to a required minimum size. Accordingly, a reducing amount of a compressing area caused by chamfering is minimized so that stability of a seal can be secured. As a result, the seat ring is used for the butterfly valve of an upper and lower dividing system in which the butterfly valve can be detached from piping by only disassembling the upper and lower main bodies. Thus, the butterfly valve can be easily disassembled and reassembled without causing winding-in of the seat ring. Accordingly, working efficiencies of operations such as maintenance, inspection, cleaning, etc. are greatly improved so that a desirable valve function can be maintained for a long period.

The butterfly valve in the present invention has a valve body, a valve rod, two flanged annular adapters, upper and lower main bodies divided in a horizontal direction of piping, and two annular grooves. One of first projecting portions in the seat ring and a flange of one of the annular adapters come in close contact with each other and are compressed and stored by each of the annular grooves. The above-mentioned seat ring in the present invention is fitted into this butterfly valve. Therefore, the first projecting portion as an outer edge portion of the seat ring is compressed while the upper and lower main bodies approach each other at an assembling time of the butterfly valve. A compressing amount of the first projecting portion can be sequentially increased through second, third and first chamfers in a process for compressing the first projecting portion. The first projecting portion is not compressed at once by an entire preset compressing amount, but is gradually compressed. Therefore, a horizontal frictional force taking a large winding-in action can be converted to a vertical frictional force taking a small winding-in action. Accordingly, it is possible to prevent an angular portion of the first projecting portion from being wound inside. Further, the three kinds of chamfers are formed on a valve rod hole side of the first projecting portion. The second, third and first chamfers are continuously arranged in a small order of a chamfering size. Therefore, the chamfering size of the first chamfer can be set to a required minimum size. Accordingly, a reducing amount of a compressing area caused by chamfering is minimized so that stability of a seal can be secured. As a result, the butterfly valve can be easily disassembled and reassembled without causing winding-in of the seat ring by a user. Accordingly, working efficiencies of operations such as maintenance, inspection, cleaning, etc. are greatly improved so that a desirable valve function can be maintained for a long period.

Many widely different embodiments of the present invention may be constructed without departing from the spirit and scope of the present invention. It should be understood that the present invention is not limited to the specific embodiments described in the specification, except as defined in the appended claims.

What is claimed is:

1. A seat ring resiliently fitted into upper and lower main bodies of a butterfly valve provided by dividing the butterfly valve into two sections in a horizontal direction of piping so as to prevent a fluid from being leaked from the butterfly valve;

the seat ring comprising:
a cylindrical portion for storing a valve body of said butterfly valve and constructed such that both end faces of the cylindrical portion respectively come in contact with two flanged annular adapters of said butterfly valve;

two valve rod holes opposed to each other and formed in said cylindrical portion such that a valve rod for pivotally supporting said valve body extends through the valve rod holes;

two first projecting portions having an annular shape and a rectangular shape in cross section and respectively projecting from an outer circumferential face of the cylindrical portion onto an outer side in a diametrical direction at both end edges of said cylindrical portion;

a first chamfer formed in the range of a first angle around each of the valve rod holes as a center on each of valve rod hole sides of said first projecting portions coming in contact with inner faces of said main bodies; and a second chamfer formed in the range of an angle except for said first angle on each of the valve rod hole sides of said first projecting portions;

the seat ring being constructed such that a size of said first chamfer is larger than that of said second chamfer and a third chamfer is gradually connected between the first and second chamfers.

2. A seat ring as claimed in claim 1, wherein said first chamfer is approximately formed within 30 degrees from the center of each of the valve rod holes on each of both sides of the valve rod holes, and said second chamfer is approximately formed in the range of an angle equal to or greater than 45 degrees from the center of each of the valve rod holes on each of both the sides of the valve rod holes.

3. A seat ring as claimed in claim 1, wherein the size of said first chamfer is set to 1.5 times or more the size of said second chamfer.

4. A seat ring as claimed in claim 1, wherein a second projecting portion is formed on an outside face of each of said first projecting portions such that the second projecting portion projects on an outer side in an axial direction from this outside face, and the second projecting portion has an annular shape and an inside diameter equal to or larger than an outside diameter of said cylindrical portion.

5. A seat ring as claimed in claim 1, wherein a valve seat receiving portion is formed around each of said valve rod holes on an inner circumferential face of said seat ring and has a valve seat having a recessed spherical shape and formed in the shape of a concentric circle of each of said valve rod holes;

the valve seat receiving portion is formed in a planar shape in which an upper face of the valve seat receiving portion is perpendicular to said valve rod; and each of side faces of the valve seat receiving portion is perpendicular to said upper face and is located in the vicinity of an end face of said cylindrical portion such that the valve seat receiving portion comes in contact with said annular adapters.

6. A butterfly valve fitting a seat ring thereto;

the seat ring resiliently fitted into upper and lower main bodies of the butterfly valve provided by dividing the butterfly valve into two sections in a horizontal direction of piping so as to prevent a fluid from being leaked from the butterfly valve;

the seat ring comprising:
a cylindrical portion for storing a valve body of said butterfly valve and constructed such that both end faces of the cylindrical portion respectively come in contact with two flanged annular adapters of said butterfly valve;

two valve rod holes opposed to each other and formed in said cylindrical portion such that a valve rod for pivotally supporting said valve body extends through the valve rod holes;

two first projecting portions having an annular shape and a rectangular shape in cross section and respectively projecting from an outer circumferential face of the cylindrical portion onto an outer side in a diametrical direction at both end edges of said cylindrical portion;

a first chamfer formed in the range of a first angle around each of the valve rod holes as a center on each of valve rod hole sides of said first projecting portions coming in contact with inner faces of said main bodies; and a second chamfer formed in the range of an angle except for said first angle on each of the valve rod hole sides of said first projecting portions;

the seat ring being constructed such that a size of said first chamfer is larger than that of said second chamfer and a third chamfer is gradually connected between the first and second chamfers;

the butterfly valve comprising:
the valve body stored into said seat ring;
the valve rod rotatably supporting said valve body;
the two flanged annular adapters respectively coming in contact with both end faces of said seat ring;
the upper and lower main bodies divided in the horizontal direction of piping and storing the seat ring and the valve body and supporting said valve rod; and
two annular grooves formed on inner faces of said main bodies such that one of the first projecting portions in said seat ring and a flange of one of said annular adapters come in close contact with each other and are compressed and stored by each of the two annular grooves.

7. A butterfly valve as claimed in claim 6, wherein said main bodies have a planar portion formed within each of the annular grooves in parallel with a divisional face of said main bodies to prevent a relative movement of said main bodies and said annular adapters in a circumferential direction; and the flange of each of said annular adapters has at least one linear notch portion corresponding to said planar portion.

8. A butterfly valve as claimed in claim 6, wherein an inside face of each of the grooves formed in said main bodies and coming in contact with each of the first projecting portions of said seat ring is slightly inclined inside the seat ring.

9. A butterfly valve as claimed in claim 8, wherein an angle of said inclination ranges from 1 degree to 5 degrees.

10. A butterfly valve as claimed in claim 6, wherein said divided main bodies respectively have boss portions having the same face as a divisional face to fix the divided main bodies to each other by a bolt; and a planar groove is formed in at least one of the boss portions of the divided main bodies to definitely determine a clearance externally opening between the boss portions fixed to each other.

11. A butterfly valve as claimed in claim 10, wherein said planar groove has 0.5 mm or more in depth and has 2 mm or more in length.

* * * * *